United States Patent [19]
Takagi

[11] Patent Number: 5,572,285
[45] Date of Patent: Nov. 5, 1996

[54] IMAGE FORMING APPARATUS

[75] Inventor: Atsushi Takagi, Kanagawa, Japan

[73] Assignee: Fuji Photo Film Co., Ltd., Kanagawa, Japan

[21] Appl. No.: 438,468

[22] Filed: May 10, 1995

Related U.S. Application Data

[63] Continuation of Ser. No. 144,360, Nov. 1, 1993, abandoned.

[30] Foreign Application Priority Data

Oct. 30, 1992 [JP] Japan ................................ 4-293013

[51] Int. Cl.⁶ .............................. G03B 27/30; G03D 3/00
[52] U.S. Cl. ............................ 355/27; 430/130; 430/199
[58] Field of Search ............................. 355/27; 430/130, 430/199; 354/300, 304

[56] References Cited

U.S. PATENT DOCUMENTS

| | | | |
|---|---|---|---|
| 4,332,456 | 6/1982 | Kaufmann | 354/298 |
| 4,918,486 | 4/1990 | Nakamura et al. | 355/106 |
| 5,087,928 | 2/1992 | Okino | 346/108 |
| 5,122,433 | 6/1992 | Kawaguchi | 430/203 |

Primary Examiner—Michael L. Gellner
Assistant Examiner—D. P. Malley
Attorney, Agent, or Firm—Sughrue, Mion, Zinn, Macpeak & Seas

[57] ABSTRACT

The improved image forming apparatus first performs scan exposure on a light-sensitive material, then applies an image forming solvent to the exposed light-sensitive material, brings the light-sensitive material and an image-receiving material into a superposed relationship, and performs thermal development and transfer on the assembly to form an image on the receiving material. The apparatus is characterized by performing image formation with the temperature conditions for thermal development being held substantially constant whereas the other conditions for thermal development and transfer being preset in accordance with various combinations of the light-sensitive and image-receiving materials. The apparatus is capable of selection from a plurality of species of the light-sensitive and image-receiving materials and even if the species of the light-sensitive or image-receiving material to be used is changed, efficient image formation can be done without waiting for the end of temperature adjustments and, furthermore, high-quality image can be formed in a consistent manner.

5 Claims, 4 Drawing Sheets

IMAGE FORMING APPARATUS

This is a continuation of application Ser. No. 08/144,360 filed Nov. 1, 1993 now abandoned.

BACKGROUND OF THE INVENTION

This invention relates to an image forming apparatus that forms an image on a light-sensitive material and which transfers said image onto a receiving material. More particularly, the invention relates to an image forming apparatus that is capable of selection from a plurality of light-sensitive materials and image-receiving materials and which yet has a capability for efficient formation of high-quality image irrespective of which combination of light-sensitive and image-receiving materials is selected.

An image forming apparatus is known that performs scan exposure on a color document to form a latent image on a light-sensitive material, which is then placed in superposition on a receiving material and subjected to thermal development and transfer so that the developed image is transferred onto the receiving material, followed by separating the light-sensitive material to leave a hard copy on the receiving material.

To copy the image of color reflection-type originals such as printed matter and photographs with such image forming apparatus by a certain exposure technique, say, slit scan exposure, a latent image is first formed by scanning with an exposure unit that comprises in combination a linear scanning head for issuing illuminating light, a plurality of mirrors, light modifying color filters and diaphragm, imaging lenses, etc.

Stated specifically, the linear scanning head is moved in a direction generally perpendicular to its length so that the reflection-type original placed on the document platen is scanned two-dimensionally with slit light. The slit light reflected from the original is guided by the plurality of mirrors to travel in a pre-determined optical path and, after being adjusted for its colors and quantity by means of the color filters and diaphragm and for the imaging position, magnification, etc. by means of the imaging lens, the light is admitted and focused at the position of image-wise exposure of the light-sensitive material which is moving at a predetermined speed in a direction associated with the movement of the scanning head, thereby completing the process of exposure of the light-sensitive material.

The slit exposed light-sensitive material is then coated with an image forming solvent such as water or alcohol and placed into a superposed relationship with an image receiving material, with the combination being transported to a thermal development and transfer unit.

The thermal development and transfer unit is composed of a heating drum and an endless belt wound onto the drum. The combination of the light-sensitive and image-receiving materials is transported as it is held between the drum and the endless belt either continuously or intermittently as required, whereby the image on the light-sensitive material is developed and transferred onto the receiving material.

After the end of thermal development and transfer, the light-sensitive material is separated from the image-receiving material and ejected into a disposal tray, whereas the image-receiving material is transported to a recovery tray and used as a hard copy.

This is the process of image formation by thermal development and transfer, in which the light-sensitive material coated with an image forming solvent is placed into a superposed relationship with the receiving material and then subjected to thermal development and transfer. With the recent increase in the versatility of the application of hard copies, the scope of documents to be copied has expanded from the conventional reflection-type originals such as printed matter and photographs to various other types including transmission-type originals such as negatives and reversal films and, accordingly, many types of light-sensitive materials have become available, including positive-acting types, negative-acting types and high-density types which have high gamma (gradation) values.

This is also true with image-receiving materials and various types have become available in accordance with the specific use of hard copies. For example, there are used today not only thick- and thin-gage papers but also OHP paper which is used as the original for overhead projectors (OHPs). It has even become possible to select glossy or nonglossy thick- or thin-gage papers.

With such image forming apparatus that relies upon thermal development and transfer using more than one kind of light-sensitive and image-receiving materials, it is necessary to make temperature adjustments not only for the image forming solvent but also for the performance of thermal development in accordance with the specific combination of light-sensitive and image-receiving materials.

The efficiency of color formation varies with different light-sensitive materials and if the image of the same original is reproduced with different light-sensitive materials under the same conditions of development, the color density will vary with the specific light-sensitive material used, thereby producing images having different colors and densities.

Furthermore, the image forming apparatus that relies upon thermal development and transfer performs these steps with the light-sensitive material placed in superposed relationship with the image-receiving material.

The thickness (heat conductivity), surface properties and other characteristics of the image-receiving material vary with its type and, therefore, if the image of the same original is reproduced on different receiving materials under the same conditions of development, the efficiency of thermal development and image transfer will fluctuate, thereby producing images having different colors and densities.

Under the circumstances, the conventional image forming apparatus is so adapted that not only temperature of an image forming solvent such as water but also the temperature for thermal development is adjusted to perform image formation under the conditions of thermal development and transfer that are suited for the specific combination of light-sensitive and image-receiving materials, thereby insuring that image of high quality will be formed consistently irrespective of which combination of light-sensitive and image-receiving materials is selected.

Therefore, if one wants to change the kind of the light-sensitive material or image-receiving material to be used on this conventional apparatus, he has to wait until the temperature of the image forming solvent or the temperature for thermal development becomes best suited for the specific kind of the light-sensitive material or image-receiving material or their combination. In fact, however, such temperature adjustments are rather time-consuming and make it difficult to perform the desired image formation in a rapid and efficient manner.

BRIEF SUMMARY OF THE INVENTION

The present invention has been accomplished under these circumstances and has as an object providing an image forming apparatus that is capable of selection from a plurality of light-sensitive and image-receiving materials and which performs scan exposure on a selected light-sensitive material to form the latent image of an original, followed by coating the exposed light-sensitive material and/or a selected image-receiving material with an image forming solvent, and in which the light-sensitive material and the image-receiving material are brought into a superposed relationship and subjected to thermal development and transfer to form the developed image of the original on the receiving material. This apparatus is further characterized in that it is capable of efficient image formation without waiting for the end of temperature adjustments even in the case of changing the species of the light-sensitive material or image-receiving material to be used.

This object of the present invention can be attained by an image forming apparatus that first performs scan exposure on a light-sensitive material and then applies an image forming solvent to at least one of the exposed light-sensitive materials and an image-receiving material onto which a developed image is to be transferred, said light-sensitive and image-receiving materials being brought into a superposed relationship and subjected to thermal development and transfer to form the developed and transferred image on the receiving material, wherein said apparatus has a plurality of species available for both the light-sensitive material and the image-receiving material and that image formation is performed with the temperature conditions being held substantially constant whereas the other conditions for thermal development and transfer are preset in accordance with various combinations of said light-sensitive and image-receiving materials.

Preferably, one of said other conditions for thermal development and transfer is the time of thermal development and transfer which is adjusted in accordance with the specific combination of said light-sensitive and image-receiving materials.

The object of the present invention can be attained by an image forming apparatus comprising: means for performing scan exposure on a light-sensitive material; means for applying an image forming solvent to at least one of the exposed light-sensitive material and an image-receiving material onto which a developed image is to be transferred; means for bringing said light-sensitive and image-receiving materials into a superposed relationship; means for subjecting the light-sensitive and image receiving materials to thermal development and transfer to form the developed and transferred image on the receiving material; means for supplying the light-sensitive and image-receiving materials which has a plurality of species available for both the light-sensitive materials and the image-receiving materials; and means for controlling that image formation is performed with the temperature conditions being held substantially constant whereas the other conditions for thermal development and transfer being preset in accordance with various combinations of said light-sensitive and image-receiving materials.

Preferably, said means for controlling adjusts the time of thermal development and transfer as one of said other conditions for thermal development and transfer in accordance with the specific combination of said light-sensitive and image-receiving materials.

DETAILED DESCRIPTION OF THE INVENTION

Figure 1:
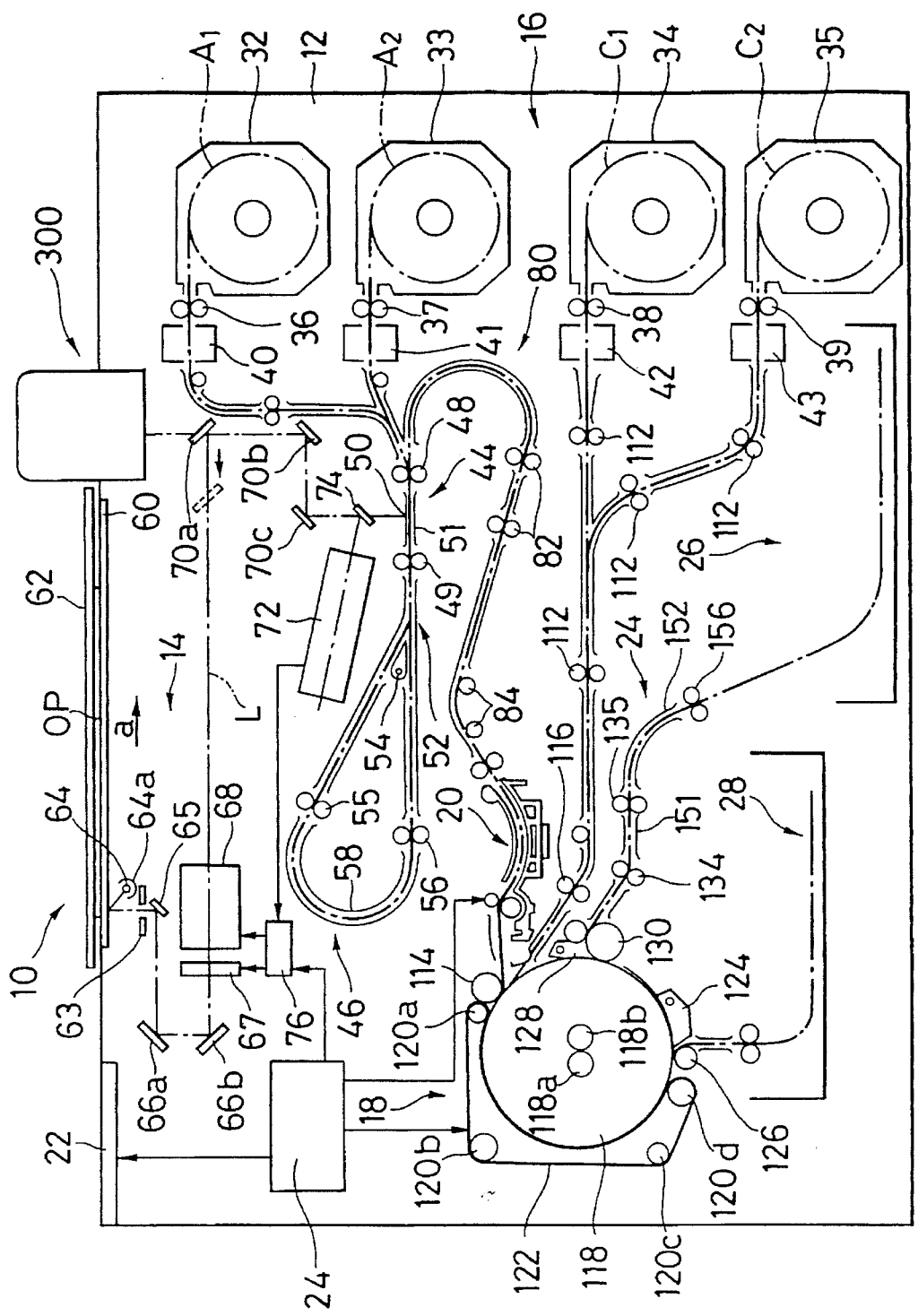
FIG. 1 is a simplified cross-sectional view showing a copier as one embodiment of the image forming apparatus of the present invention.

The image forming apparatus of the present invention performs scan exposure on either a reflection-type or transmission-type original to form a latent image on a light-sensitive material, applies an image forming solvent such as water onto the exposed light-sensitive material and/or an image-receiving material, brings them into a superposed relationship, performs thermal development and transfer to have the developed image transferred to the receiving material, and separated the light-sensitive material from the image-receiving material. The apparatus is capable of selection from a plurality of light-sensitive materials (e.g. positive-acting, negative-acting and high-density types), as well as from a plurality of image-receiving materials (e.g. thick-gage, thin-gage and OHP papers) in accordance with the species of document to be copied and the specific use of the image to be formed. Throughout the process of thermal development and transfer which starts with the application of an image forming solvent and ends with the separation of the light-sensitive material from the image-receiving material, the temperature conditions are held substantially constant while other conditions for image formation such as the time of thermal development are properly adjusted in accordance with the specific combination of light-sensitive and image-receiving materials.

When producing hard copies with the conventional image forming apparatus by means of thermal development and transfer using a light-sensitive and an image-receiving material, the formed image will have different colors or densities depending on the types of light-sensitive and image-receiving materials used even if the image is formed from the same document. Under the circumstances, the conventional apparatus is so adapted that image formation is performed with temperature adjustments being made not only on the image forming solvent but also on thermal development in accordance with the specific combination of light-sensitive and image-receiving materials, thereby assuring that uniform image formation can be accomplished irrespective of which species of light-sensitive or image-receiving material is selected.

Therefore, if one wants to change the type of light-sensitive or image-receiving material to be used on the conventional apparatus, he is unable to restart image formation until after the temperatures of the image forming solvent and the heating source for thermal development reach predetermined levels that comply with the specific combination of the two materials; this makes it impossible to achieve rapid and efficient image formation.

In contrast, the image forming apparatus of the present invention is so adapted that the temperature conditions for thermal development and transfer, namely, the temperature of the image forming solvent and that for thermal development, are held constant whereas other conditions such as the time of thermal development, the transport speed of the light-sensitive material and the coating weight of the image forming solvent are adjusted in accordance with the specific combination of the light-sensitive and image-receiving materials, thereby insuring that uniform image formation can be realized irrespective of which combination of the two members is selected.

Hence, in accordance with the present invention, there is provided an image forming apparatus that is capable of selection from a plurality of light-sensitive and image-receiving materials and which yet eliminates the time to wait for the end of temperature adjustments even in the case of changing the species of the light-sensitive material or image-receiving material to be used, whereby it becomes possible to form high-quality image in a highly efficient and rapid manner.

The image forming apparatus of the present invention is described below in detail with reference to the preferred embodiment illustrated in the accompanying drawings.

FIG. 1 shows a copier as one embodiment of the image forming apparatus of the present invention.

Figure 3:
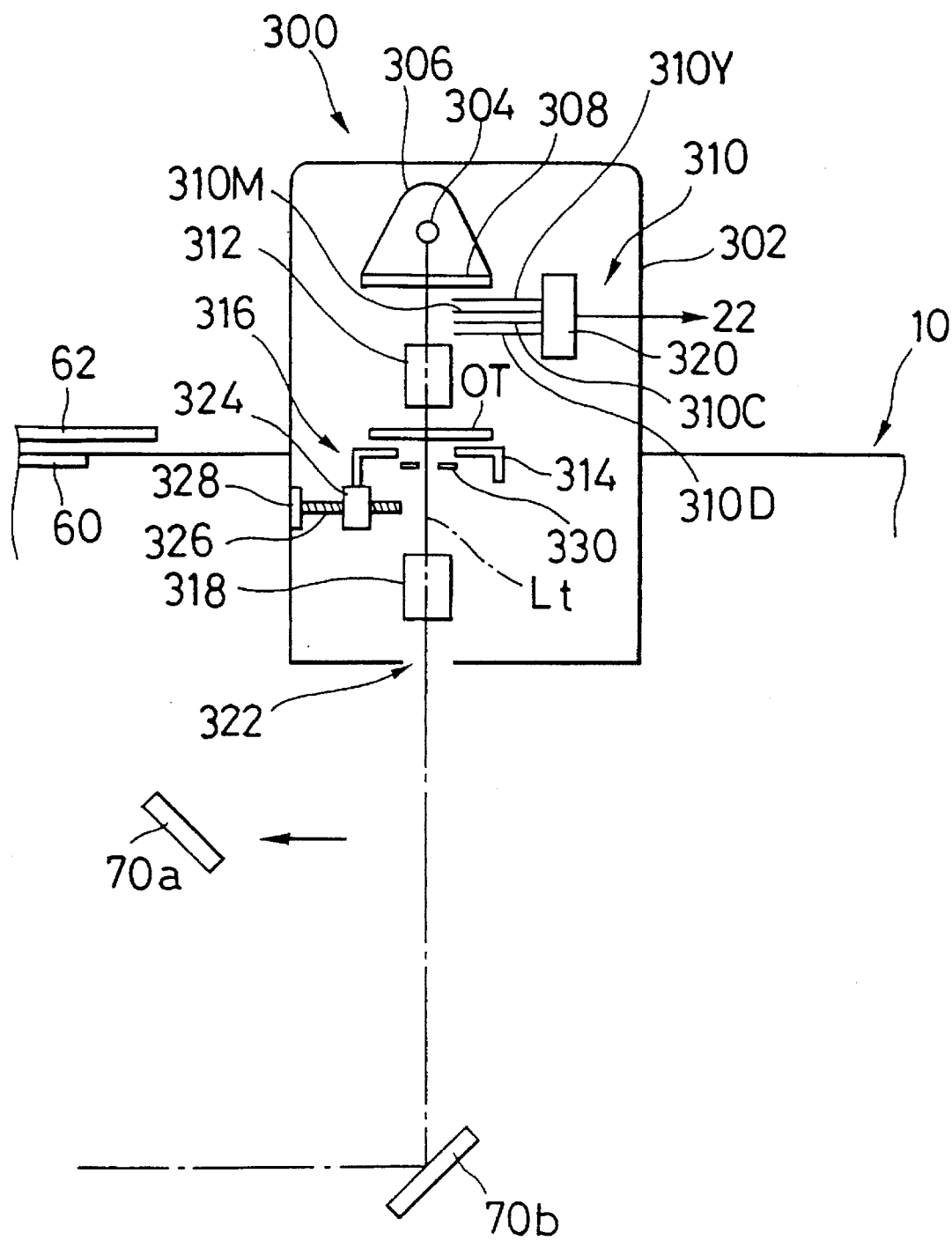
FIG. 3 is a diagram showing the concept of the film scanning unit to be loaded in the copier shown in FIG. 1.

The copier shown by 10 in FIG. 1 is adapted for selection between two types of light-sensitive material (positive-acting type A1 and negative-acting type A2) and between two types of image-receiving materials (thick-gage type C1 and thin-gage type C2) so as to copy the image of an original OP or a transmission-type original OT such as a negative or a slide (see FIG. 3). This copier 10 comprises the following basic components: an exposure unit 14 that is located in the upper part of the housing 12; a light-sensitive material/image-receiving material supply section 16 that is located on a lateral side of the housing 12 (which section is hereunder designated simply as a supply section 16); a thermal development and transfer section 18 that is located on the other lateral side of the housing 12 opposite the side where the supply section 16 is located; a water applicator section 20 that is located between the supply section 16 and the thermal development and transfer section 18; an image-receiving material recovery tray 26; a disposal tray 28 located on the side of the thermal development and transfer section 18 which is downstream the transport of the light-sensitive material; an operating panel 22 located on top of the housing 12 to perform the necessary operations for selection of light-sensitive and image-receiving materials, determination of copy ratio, and color/density adjustments; and a control unit 24 which controls the transport speed of the light-sensitive material A and the image-receiving material C in the copier 10, especially in the water applicator section 20 and/or the stay time thereof in the thermal development and transfer section 18 to adjust the preset conditions for thermal development and transfer such as the thermal development time and the coating weight of the image forming solvent under the substantial constant thermal conditions in accordance with the specific combination of the selected light-sensitive material A and the selected image-receiving material C so as to achieve intend image formation.

The copier 10 is fitted in the upper right portion (as seen in FIG. 1) with a detachable film scanning unit 300 for copying the image of a transmission-type original OT.

The following description concerns the case where the image forming apparatus of the present invention is embodied as a copier that relies upon slit scan exposure; however, it should be understood that this is not the sole case of the use of the apparatus under consideration and that it is also applicable with advantage to a "raster scanning" image forming apparatus, which modulates a light beam in accordance with the image information supplied from a relevant source such as image reading equipment or computer and which deflects the modulated beam in the fast (main) scan direction while, at the same time, it transports a light-sensitive material in the slow (auxiliary) scan direction which is generally perpendicular to the fast scan direction, thereby performing two-dimensional scan exposure on the light-sensitive material with the light beam.

The basic procedure for the operation of copier 10 is as follows: the original OP (or transmission-type original OT) is subjected to slit scan exposure to form a latent image on positive-acting light-sensitive material A1 or negative-acting light-sensitive material A2 (the two types of light-sensitive material are hereunder sometimes collectively referred to as "light-sensitive material A"); the light-sensitive material A is transported into the water applicator 20 where it is coated with water (image forming solvent) at a predetermined temperature (ca. 40° C.); the light-sensitive material A is then supplied into the thermal development and transfer section 18, where it is brought into a superposed relationship with either thick-gage image-receiving material C1 or thin-gage receiving material C2 (the two types of image-receiving material are hereunder sometimes collectively referred to as "image-receiving material C") and thermal development for a predetermined time and subsequent transfer are performed in accordance with the specific combination of light-sensitive material A and image-receiving material C; thereafter, the light-sensitive material A is separated from the image-receiving material C to leave the copied image of document OP (or OT) on the latter.

The supply section 16 is loaded with four magazines 32–35 in position; the magazine 32 is for containing the positive-acting light-sensitive material A1 as it is wound on itself; the magazine 33 is for containing the negative-acting light-sensitive material A2 as it is wound on itself; the magazine 34 is for containing the thick-gage (240 μm) image-receiving material C1 as it is wound on itself; and the magazine 35 is for containing the thin-gage (140 μm) image-receiving material C2 as it is wound on itself. These four magazines 32–35 are adapted in such a way that they can be pulled out of the housing 12 toward the operator (directed away from the paper in a direction normal to be transport of the light-sensitive material A).

The light-sensitive material A is usually selected depending upon whether the image of the document to be copied is positive or negative, whereas the image-receiving material C is selected in accordance with the intended use of the formed image (hard copy). Selection of these materials is made by manipulation on the operating panel 22.

The magazines 32 and 33 are completely shielded from light as they are contained in the housing 12 so as to avoid accidental exposure of the light-sensitive material A to light.

The supply section 16 may be loaded not with the magazine 32 or 33, but with a magazine for containing a high-density light-sensitive material of high gamma value as it is wound on itself. The section 16 may also be loaded not with the magazine 34 or 35, but with a magazine for containing OHP paper (110 μm thick) as it is wound on itself.

As already mentioned, the light-sensitive material A used in the case shown in FIG. 1 needs thermal development before image is transferred to the image-receiving material C having a receiving layer in the presence of an image forming solvent such as water. Hence, the light-sensitive material A comprises a support that carries on it light-sensitive silver halides, binders, dye donating materials, a reducing agent, etc. In the case shown in FIG. 1, the light-sensitive materials A as contained in the magazines are wound on themselves in such a way that those light-sensitive surfaces face down.

The image-receiving material C comprises a support that has a mordant containing dye fixing material coated thereon. The image-receiving materials C have a smaller width than the light-sensitive materials A and they are contained in the magazines as they are wound on themselves in such a way that the surfaces where images are to be formed face up.

Located ahead of the magazines 32 and 33 are withdrawing roller pairs 36 and 37, and located ahead of the magazines 34 and 35 are withdrawing roller pairs 38 and 39 that are in alignment with the exits of the respective magazines. Located further ahead are cutters 40, 41, 42 and 43 for cutting the light-sensitive materials A and the image-receiving materials C, respectively, to predetermined lengths. It should be mentioned here that the image-receiving material C is cut to a slightly shorter length than the light-sensitive material A in order to insure that the two members can be easily separated after the subsequent steps of thermal development and transfer.

After the cutters 40 and 41 were activated, the respective withdrawing roller pairs 36 and 37 associated with the light-sensitive materials A will rotate in a reverse direction up to a position where they barely grip the leading end portions of the light-sensitive materials A so that said portions will not be deteriorated by accidental exposure to light. After the cutters 42 and 43 were activated, the respective withdrawing roller pairs 38 and 39 associated with the image-receiving materials C release them so that those leading end portions will not be damaged.

Located behind the cutters 40 and 41 (the term "behind" as used hereinafter means a position downstream the transport of the light-sensitive materials A or the image-receiving materials C) is an exposing section 44 and located further behind is a reversing section 46.

The light-sensitive material A that has been withdrawn by the roller pair 36 and which has been cut to a predetermined length by the cutter 40 passes through the exposing section 44 to enter the reversing section 46, where it is turned upside down; the thus reversed light-sensitive material A is transported again into the exposing section 44, where it is exposed to light by means of the exposure unit 14 which is to be described in detail hereinafter.

The exposing section 44 is composed of transport roller pairs 48 and 49, an exposure plane forming glass 50 that is located between the transport roller pairs 48 and 49 and which defines both the transport path of the light-sensitive material A and the exposing position, and a presser plate 51 that depresses the light-sensitive material A against the exposure plane forming glass 50.

Stated more specifically, the light-sensitive material A as transported by the roller pairs 48 and 49 passes through the exposing section 44 before it is transported to the reversing section 46, where it is turned upside down so that the light-sensitive surface will face up; the thus reversed light-sensitive material A is transported again into the exposing section 44, where it is subjected to scanning exposure by the exposure unit 14 as it is held between the exposure plane forming glass 50 and the presser plate 51 so that it is controlled to lie at a predetermined exposing position.

The reversing section 46 is composed of a branch guide 52 for splitting the transport path of the light-sensitive material A into an upper and a lower branch, a flapper 54 that determines which branch of the transport path should be followed by the light-sensitive material A when it comes to the branch guide 52, transport rollers pairs 55 and 56, and a guide 58 that forms the transport path along which the light-sensitive material A is reversed.

When the light-sensitive material A is transported past the exposing section 44, the flapper 54 first acts on the lower branch of the guide 52 so that the light-sensitive material A is guided to the upper branch.

The light-sensitive material A thus transported to the upper branch of the guide 52 is directed by the guide 58 as it is turned upside down by means of transport roller pairs 55 and 56. As a result, the light-sensitive material A is reversed in such a way that its light-sensitive surface will face up before it is transported again into the exposing section 44. For the second transport into the exposing section 44, the flapper 54 acts on the upper branch of the guide 52 so that the lower branch will be open.

Located above the exposing section 44 (i.e., in the upper part of the housing 12) is the exposure unit 14 that performs the slit scan exposure of the original image on the light-sensitive material A over a magnification of 50–200%.

Positioned on top of the housing 12 of the copier 10 are a document platen 60 on which an original OP is to be placed and which is typically made of transparent glass, and a document pressing plate 62 that is fitted as required to fix the original OP on the platen 60 and which may be removed if there is no need to use it.

When copying the image of a comparatively large-size transmission-type original such as a 4(in)×5(in) size lantern slide, negative film or sleeve, the plate 62 is removed and the dedicated light source unit for illuminating the transmission-type original on the platen 60 is mounted in a predetermined position.

Located below the document platen 60 is a light source unit that is an integral assembly of an exposing light source 64 to be used for copying the image of the original OP, a reflector 64a, a mirror 65, and a slit defining member 63 that restricts the width in the scanning direction of light issuing from the light source 64 that has been reflected by the document OP.

The light source under consideration moves beneath the platen 60 in the scanning direction indicated by arrow a so that the document OP is illuminated with light from the light source 64.

The light that issued from the light source 64 and which has been reflected by the document OP(or the document pressing plate) is then admitted into a mirror unit which is an integral assembly of two mirrors 66a and 66b and by which the light traveling in the optical path L is reflected in predetermined directions. The mirror unit is adapted to move in the same direction as the above-mentioned light source unit (below the platen 60) but at one half the speed of the latter.

Figure 2:
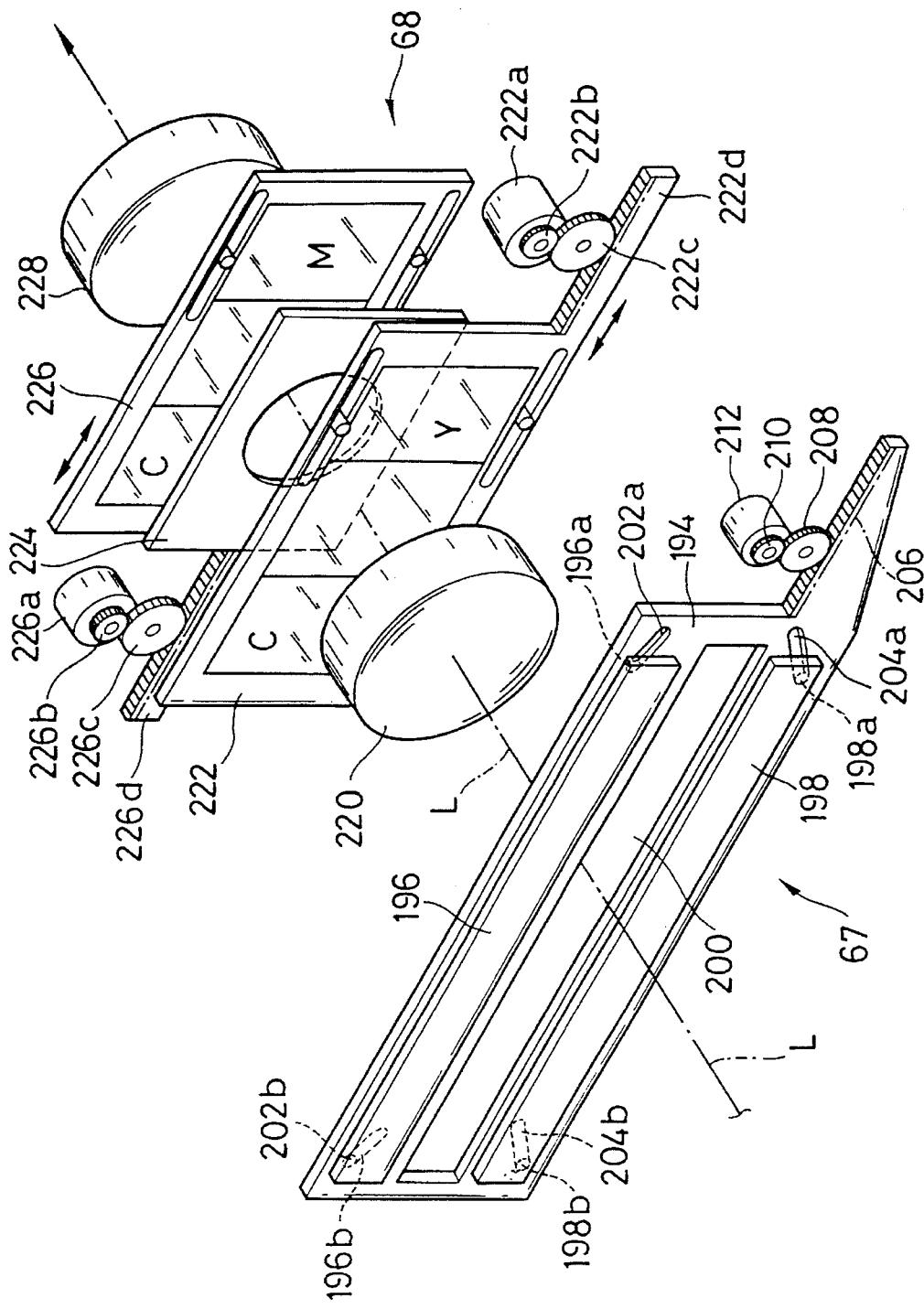
FIG. 2 is a perspective view showing an example of the variable diaphragm and lens unit in the copier shown in FIG. 1.

Located in the optical path L behind the mirror unit are a variable diaphragm 67 and a lens unit 68, the combination of which serves to make exposure, light quality and focus adjustments. FIG. 2 shows an example of the variable diaphragm 67 as combined with the lens unit 68.

The variable diaphragm 67 consists basically of a plate cam 194 having an opening 200 and a pair of diaphragm plates 196 and 198. The plate cam 194 causes the two diaphragm plates 196 and 198 to either approach or depart from each other so that the area of the opening 200 is adjusted to control the quantity of passage of oncoming reflected light in the optical path L.

A rack 206 is formed on the plate cam 194 and it meshes with a stepping motor 212 via gears 208 and 210. Hence, if the stepping motor 212 rotates clockwise, the plate cam 194 will move to the right as seen in FIG. 2 and if the stepping motor 212 rotates counterclockwise, the cam 194 will move to the left.

The plate cam 194 also has inclined grooves 202a and 202b at two top corners, as well as inclined grooves 204a and 204b at two bottom corners. Pins 196a and 196b projecting from the diaphragm plate 196 are in engagement with the grooves 202a and 202b, respectively, whereas pins 198a and 198b projecting from the diaphragm plate 198 are in engagement with the grooves 204a and 204b, respectively.

Each of the diaphragm plates 196 and 198 is fixed by a certain means (not shown) so that they will not move from left to right or vice versa as seen in FIG. 2. However, if the rotation of the stepping motor 212 causes the plate cam 194 to move from left to right or vice versa, the diaphragm plate 196 (or 198) moves in a corresponding vertical direction along the grooves 202a and 202b (or grooves 204a and 204b), whereupon the amount of insertion of the diaphragm plates into the optical path L varies to determine the amount by which the diaphragm 67 is to be stopped down.

The reflected light the effective amount of which has been adjusted by the variable diaphragm 67 and which keeps traveling in the optical path L is then admitted into the lens unit 68.

The lens unit 68 comprises imaging lenses that allow the reflected light from the document OP to focus on the light-sensitive material A and which are combined with light-modifying color filters. Stated more specifically, the lens unit 68 comprises, in order from the upstream side of the optical path L, a front lens group 220 (as an imaging lens), a first color filter plate 222, a fixed diaphragm 224, a second color filter 226, and a rear lens group 228 (also an imaging lens).

The first and second color filter plates 222 and 226 are typically made of a transparent glass plate and films of color filter for different colors are evaporated on both sides on the central clear portion of each plate. In the case shown in FIG. 2, the first color filter plate 222 has a cyan (C) and a yellow (Y) color filter whereas the second color filter plate 226 has a cyan (C) and a magenta (M) color filter.

The purpose of these color filter plates is to modify the oncoming reflected light in the optical path L by adjusting the amount in which the color filters Y, M and C are inserted into the optical path L.

The amounts by which the respective color filters in the first color filter plate 222 (or the second color filter plate 226) are to be inserted into the optical path L are adjusted by the combination of the following parts: a stepping motor 222a (or 226a) serving as a drive source; a gear wheel 222b (or 226b) provided at an end of the shaft of the motor; a reducing gear wheel 222c (or 226c) that meshes with the gear wheel 222b (or 226b); and a rack 222d (or 226d) that is formed on the first color filter plate 222 (or the second color filter plate 226) and which meshes with the reducing gear wheel 222c (or 226c).

The variable diaphragm 67 and the lens unit 68 are connected to a control unit 76. When setting the image forming conditions or making the necessary color/density adjustment (color and/or density adjustment by a manual method) or on the basis of the result of measurement with an image sensor assembly 72 to be described hereinafter, the control unit 76 controls the diaphragm aperture D and the amounts of insertion of color filters Y, M and C in order to adjust not only the passage of light through the variable diagram 67 but also the modification of the quality of light by the respective color filters Y, M and C (or the quantity of light passing through those filters).

The control unit 76 in turn is connected to the operating panel 22, which is touched by the user to set the image forming conditions or make the necessary color/density adjustment by means of the variable diaphragm 67 and the lens unit 68.

Located in the optical path L behind the lens unit 68 are mirrors 70a, 70b and 70c for causing the reflected light to be reflected in a predetermined direction. The oncoming reflected light in the optical path L is further reflected in predetermined directions by those mirrors and keeps traveling in the optical path L until it reaches a predetermined position in the exposing section 44, where it is focused for exposure of the light-sensitive material A in the process of scanning transport.

When copying the transmission-type original using the film scanning unit 300 (when copying a slide OS), the mirror 70a moves to the position indicated by a dashed line in FIG. 1.

As already mentioned, the transmission-type original OT such as a 135 size lantern negative film, slide or the like is copied using the film scanning unit 300, and the copier 10 is fitted in the upper right portion of the housing 12 (as seen in FIG. 1) with the detachable film scanning unit 300 which provides exposure optics for copying the image of a transmission-type original. FIG. 3 shows conceptually the film scanning unit 300.

By scanning the transmission-type original OT for enlarged projection onto the light-sensitive material A, the film scanning unit 300 produces a copy of the image of transmission-type original OT on the light-sensitive material A as it is enlarged at a magnification of 200–50%. The film scanning unit 300 has the following basic parts contained in the housing 302: a light source section having a light source 304, a reflector 306 and a heat-shield filter 308 arranged along the optical path LT of the projecting light to form a unitary assembly; a filter section 310; a diffusion glass 312; a scanning means 316 for scanning the transmission-type original OT as it is held in a predetermined position; and zoom lens 318.

The light source 304 may be of any type that is suitable for color reprography, as exemplified by a halogen lamp and a flash lamp. The reflector 306 causes the light from the light source 304 to be reflected towards the slide OT and is typically composed of a concave reflecting mirror. The heat-shield filter 308 absorbs heat rays and other deleterious components of the light radiated from the light source 304 and transmits only the visible light that is necessary for exposure.

The filter section 310 is composed of three color filter plates, yellow (Y) filter 310Y, magenta (M) filter 310M and cyan (C) filter 310C, an ND filter 310D for adjusting the quantity of light, and control unit 320 for controlling the respective filters to be inserted into the optical path LT of projecting light by predetermined amounts.

The filter section 310 shown in FIG. 1 controls the amounts of insertion of the color filters and ND filter 310D in such a way that the color shades and quantity of projecting light from the light source 304 are adjusted to perform the necessary color and density adjustment for image formation.

In order to set the conditions for image formation (copying) with the film scanning unit 300 or in order for the user to perform color/density adjustments when copying the image of the transmission-type original OT and in accordance with such information as the exposure correcting conditions supplied from the image sensor assembly 72, the control unit 320 moves the respective filters by a known moving means such as a rack and pinion using associated pulse motors as drive sources, whereby the amounts of insertion of the filters into the optical path are adjusted. Further, the control unit 320 stores the settings of the image forming conditions (namely, the conditions initially set for copying the original OT) and, if the original OT copy mode is selected on the operating panel 22, the respective filters are inserted into the optical path Lt by predetermined amounts in accordance with the settings of the image forming conditions.

The diffusion glass 312 diffuses and mixes the rays of light that has been corrected for colors and adjusted for its quantity, so as to create uniform light that is free from the problem of unevenness in colors and illumination.

The scanning means 316 holds the original OT in a predetermined position and scans it by movement in synchronism with the transport of the light-sensitive material A in the exposing section 44. Having this function, the scanning means 316 is composed of a scan table 314 for setting up the original OT in position, a traveling nut 324 fitted beneath the scan table 314, a drive screw 326 threadbare with the traveling nut 324, and a motor (drive source) 328 for rotationally driving the drive screw 326.

If the drive screw 326 is rotated by the motor 328, the scan table 314 moves together with the traveling nut 324, whereupon the original OT on the scan table 314 is moved. The moving speed of the original OT is one nth of the transport speed of the light-sensitive material A, with n being the copy ratio that is achievable by the film scanning unit 300. The scan table 314 is provided with a original OT positioning means (not shown) and at least the area of the scan table which corresponds to the original OT should be formed of a transparent material or provided with an opening.

A slit defining member 330 is provided near the transmission-type original OT in such a way that it forms a slit running at an angle of substantially 90° with respect to the direction in which the original OT is to move. Thus, as in the case of scanning the document OP in the exposure unit 14, the film scanning unit 300 is also capable of performing slit scan exposure on the light-sensitive material A in the exposing section 44.

The transmitted light from the original OT which has passed through the slit undergoes magnification to 200%–850% by means of the zoom lens 318 to form an image at the exposing position in the exposing section 44.

The transmitted light from the original OT which has passed through the zoom lens 318 further passes through an opening 322 formed in the film scanning unit 300. The optical path of this light is deflected by the mirror 70*d* through an angle of about 90° so that it is brought into agreement with the optical path L of the reflected light from the document OP before it falls on the mirror 70*c*. As already mentioned, the mirror 70*a* is retracted to the position indicated by a dashed line in FIG. 1 when the image of the original OT is to be copied using the film scanning unit 300.

As in the case of the reflected light from the document OP, the transmitted light from the original OT that has been reflected downward by the mirror 70*c* is focused at a predetermined exposing position on the light-sensitive material A in the process of transport by the roller pairs 48 and 49, so as to perform slit scan exposure on the material A. The original OT is moved by the scan means 316 in synchronism with the scan transport speed of the light-sensitive material A, namely, at a speed which is one nth of the transport speed of the material A, with n being the factor of magnification by the projection optics. Hence, the whole image of the original OT is scanned for exposure on the light-sensitive material A as it is moved over the entire image region.

Located behind the mirror 70*c* is a moving mirror 74 by which the optical path of the reflected light is selectively changed so that it is admitted into either the exposing section 44 or the image sensor assembly 72. In the step of ordinary exposure, the mirror 74 is moved by a known means to a position away from the optical path L; on the other hand, for the adjustment of white balance or in the prescanning step, the mirror 74 moves to the illustrated position so that it is inserted into the optical path L for causing the reflected light to be further reflected towards the image sensor assembly 72.

The image sensor assembly 72 measures the quantity and quality of the reflected light when adjusting the white balance or in the prescanning step and, to that end, the sensor 72 contains three sensors, a red (R) sensor, a green (G) sensor and a blue (B) sensor. One unit of sensor may be employed for each color but, if desired, a total of six photo sensors may be used to measure the intensity of light at two wavelengths for each color.

After completion of the step of exposure in the exposing section 44 by means of the exposure unit 14, the light-sensitive material A is fed into the reversing section 80, where it is turned upside down in such a way that the light-sensitive surface will face down. The reversed light-sensitive material A is transported by roller pairs 82 and guided by rollers 84 to enter the water applicator section 20. After the light-sensitive material A is coated with water as an image forming solvent in the water applicator section 20, the light-sensitive material A is placed into a superposed relationship with the image-receiving material C and subjected to thermal development. Then, the image formed on the light-sensitive material A is transferred onto the image-receiving material C and the light-sensitive material A is separated from the image-receiving material C.

The copier 10 embodying the image forming apparatus of the present invention is such that throughout the process of thermal development and transfer which starts with the application of water to the light-sensitive material A and which ends with its separation from the image-receiving material C, the temperature conditions such as the temperature of water in the water applicator section 20 and the temperature for thermal development in the thermal development section 18 are held substantially constant whereas the conditions for thermal development (and transfer) which are preset in accordance with the specific combination of the light-sensitive material A and the image-receiving material C are adjusted by the control unit 24 so as to achieve intended image formation, for example, the preset thermal development time and the coating weight of the image forming solvent are adjusted by controlling the transport speed of the light-sensitive material A and the image-receiving material C, or the preset thermal development time is adjusted by controlling the stay time in the thermal development section 18, or otherwise preset conditions for thermal development and transfer are controlled.

The copier 10 of the illustrated embodiment is so adapted that the time for which the light-sensitive material A and image-receiving material C stay within the thermal development section 18 is controlled at a preset value in accordance with the combination of the two materials by the control unit 24, whereby the necessary conditions for thermal development are properly adjusted to achieve the intended image formation.

The water applicator section 20 is where water as an image forming solvent is coated on the exposed light-sensitive material A; in the case shown in FIG. 1, water heated to ca. 40° C. is applied in an amount of ca. 14 cc/m² in the applicator section.

It should be remembered that the temperature of water in the applicator section 20 is kept substantially constant irrespective of the types of the light-sensitive material A and image-receiving material C.

Figure 4:
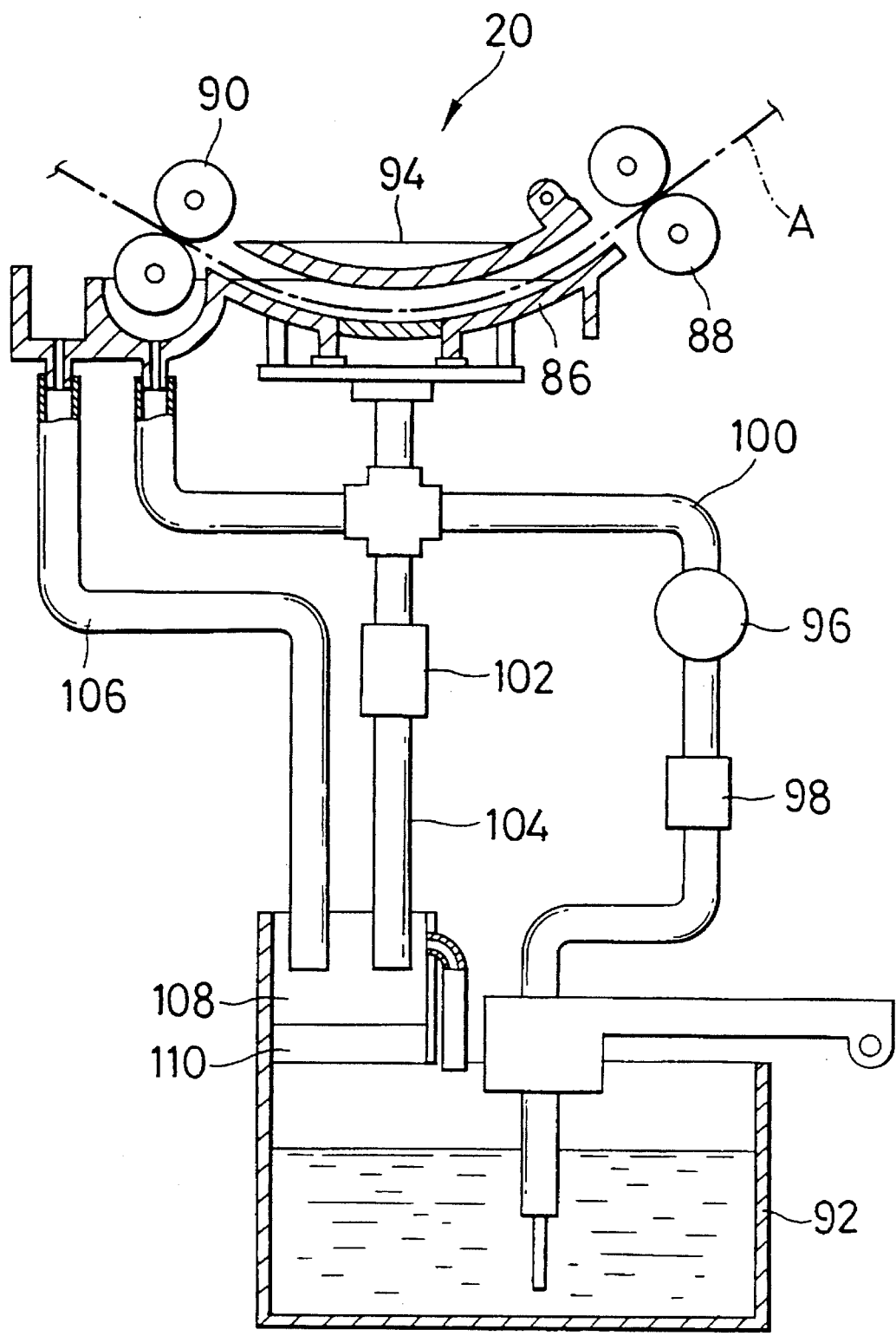
FIG. 4 is a diagrammatic view showing an example of the water applicator section of the copier shown in FIG. 1.

FIG. 4, shows an example of the water applicator section 20.

As shown, the water applicator section 20 comprises basically an application tank 86, a transport roller pair 88 positioned ahead of the application tank 86, a squeeze roller pair 90 positioned behind the application tank 86, and a water replenishing tank 92.

In the case shown, a transport guide 94 for the light-sensitive material A is located in a position where it faces the application tank 86. The light-sensitive material A emerging from the reversing section 80 is transported into the application tank 86 by means of the roller pair 88 and as it is transported between the tank 86 and the guide 94, the light-sensitive material A is coated with water which is an image forming solvent. Thereafter, the light-sensitive material A is freed of excess water by means of the squeeze roller pair 90 and then transported to the subsequent step.

The application tank 86 is connected to a supply line 100 having a pump 96 and a filter 98, so that it is supplied with water from the replenishing tank 92.

The bottom of the application tank 86 is connected to a drain line 104 having a solenoid valve 102. When the normally closed solenoid valve 102 is opened, the water in the tank 86 is drained to the replenishing tank 92.

The application tank 86 is also connected to an overflow line 106, through which excess water in the tank 86 is drained to the replenishing tank 92.

The drain line 104 and the overflow line 106 are adapted in such a way that the end of each line that extends towards the replenishing tank 92 communicated with a water tank section 108 and that water is drained into the tank 92 via a filter The image forming solvent that can be used in the present invention is in no way limited to water and it may be a mixture of water with a low-boiling point solvent such as methanol, DMF, acetone or isobutyl ketone. The replenishing tank 92 preferably contains not only the image forming solvent but also a defoaming agent.

In the illustrated case, the image forming solvent is applied to the light-sensitive material A but, if desired, it may be applied to the image-receiving material C or even to both materials.

The conditions for thermal development and transfer may also be adjusted by changing the coating weight of the image forming solvent such as water or the transport speed of the light-sensitive material A in accordance with the specific combination of the light-sensitive material A and the image-receiving material C.

The water applicator section 20 and the transport of the light-sensitive material A are driven by separate pulse motors and, hence, the coating weight of the image forming solvent and the transport speed of the light-sensitive material A may be adjusted by changing the numbers of pulses as produced from the associated pulse motors.

Referring back to FIG. 1, the thermal development and transfer section 18 is located behind the water applicator section 20.

The image-receiving material C that was drawn out of the magazine 34 in the supply section 16 and which has been cut to a predetermined length by the cutter 42 is transported by a roller pair 112 to enter the thermal development and transfer section 18.

A combining roller 114 is located at the entrance to the thermal development and transfer section 18 for allowing the water-coated light-sensitive material to be combined with the incoming image-receiving material C in such a way that the material A is offset by about 5 mm ahead of the material C.

A register roller pair 116 is located in the transport path of the image-receiving material C ahead of the combining roller 114, so that it will detect the position of the material C with a sensor (not shown) to insure that the materials A and C are combined in registry with predetermined positions.

The thermal development and transfer section 18 is composed of a heating drum 118 and an endless belt 122; the heating drum 118 contains in it two halogen lamps 118a and 118b each serving as a heating source, and the endless belt 122 is wound around the heating drum 118 and stretched on four belt support rollers 120a, 120b, 120c and 120d. In the section 18, the light-sensitive material A and the image-receiving material C combined together are carried in between the heating drum 118 and the endless belt 122, stay therebetween during the predetermined time and then take out therebetween, so that the two material are heated as they combined together. As a result of this heating operation, the latent image of the light-sensitive material A that has been formed by the step of exposure in the exposing section 44 is rendered visible and the thus developed image is transferred to the image-receiving material C for the development of colors.

The heating halogen lamps 118a and 118b will produce different powers, one outputting about 400 W and the other outputting about 800 W. To heat the drum 118 to a predetermined temperature (ca. 78° C.), both lamps are turned on but during normal operation, only the halogen lamp rated at 800 W is used to heat the drum 118.

In the thermal development and transfer section 18, the thermal development temperature is held constant at 80° C. whereas the stay time of the light-sensitive material A and the image-receiving material C is properly adjusted so that thermal development is performed for preset different times as different kinds of light-sensitive material A and image-receiving material C are combined, with the developed image on the light-sensitive material A being subsequently transferred to the receiving material C.

As already mentioned, when producing hard copies with the conventional image forming apparatus by means of thermal development and transfer using a light-sensitive material and an image-receiving material, the formed image will have different colors or densities depending on the types of light-sensitive and image-receiving materials used even if the image is formed from the same document. Under the circumstances, the conventional apparatus is so adapted that image formation is performed with the temperature conditions for thermal development and transfer (i.e. the temperature of the image forming solvent and the thermal development temperature) being adjusted in accordance with the specific combination of light-sensitive and image-receiving materials, thereby assuring that uniform image formation can be accomplished irrespective of which species of light-sensitive or image-receiving material is selected.

However, if one wants to change the type of light-sensitive or image-receiving material to be used on the conventional image forming apparatus which makes temperature adjustments in the manner just described above, he is unable to restart image formation until after the temperatures of the image forming solvent and the heating source for thermal development reach predetermined levels that comply with the specific combination of the two materials. Further, such temperature adjustments are fairly time-consuming and hence inefficient, making it impossible to accomplish rapid image formation.

In contrast, the image forming apparatus of the present invention is so adapted that the temperature conditions for thermal development and transfer, namely, the temperature of the image forming solvent and that for thermal development, are held constant whereas other conditions such as the time of thermal development, the transport speed of the light-sensitive material and the coating weight of the image forming solvent are so adjusted as to perform image formation under the conditions for thermal development and transfer that have been preset in accordance with the specific combination of the light-sensitive and image-forming materials, thereby insuring that image can be formed rapidly. In the illustrated case, the stay time in the thermal development section 18 is controlled, thereby adjusting the conditions for thermal development and transfer in accordance with the specific combination of the light-sensitive material A and image-receiving material C.

The following table 1 gives exemplary values of the stay and development times for various combinations of light-sensitive material A and image-receiving material C; the light-sensitive material A is selected from among three types, positive-acting type A1, negative-acting type A2 and high-density type, and the image-receiving material C is also selected from among three types, thick-gage C1, thin-gage C2 and OHP paper.

The data in Table 1 were obtained with the application of water and thermal development being conducted at the aforementioned constant values of 40° C. and 80° C. respectively; the rate of water application and thermal development was constant at 40 mm/sec.

TABLE 1

| Light-sensitive material | Image-receiving material | Stay time, Sec | Development time, Sec |
|---|---|---|---|
| Positive-acting | thick-gage | 8 | 17 |
| | thin-gage | 6 | 15 |
| | OHP paper | 21 | 30 |
| Negative-acting | thick-gage | 10 | 19 |
| | thin-gage | 8 | 17 |
| | OHP paper | 23 | 32 |
| High-density | thick-gage | 13 | 22 |
| | thin-gage | 11 | 20 |
| | OHP paper | 26 | 35 |

The method of adjusting the conditions for performing thermal development in the image forming apparatus of the present invention is in no way limited to the illustrated case of adjusting the stay time in the thermal development section 18 and other methods can of course be adopted such as adjusting the transport speed of the light-sensitive material A and the image-receiving material C or the coating weight of the image forming solvent. As already mentioned, these additional methods can be implemented by controlling the pulses produced from the respective pulse motors in association with the driving of water application and the transport of the light-sensitive material A. If desired, one of these methods may be combined with the adjustment of stay time in the thermal development section 18.

If necessary, the amounts of color/density adjustments by lens unit 68 may be preset in accordance with various combinations of the light-sensitive material A and the image-receiving material C, so that the adjustment of the conditions for thermal development (and transfer) is combined with color/density adjustments that are made during scan exposure of the light-sensitive material A.

The thermal development and transfer section 18 is also fitted with the combination of a first stripping finger 124 and a guide roller 126 that separates the light-sensitive material A from the image-receiving material C and which transports the separated light-sensitive material A into the disposal tray 28, as well as the combination of a second stripping finger 128 and a guide roller 130 that separates the image-receiving material C from the surface of the heating drum 118 and which transports the separated image-receiving material C into the recovery tray 26.

The combination of the light-sensitive material A and the image-receiving material C which has passed through the step of thermal transfer by means of the heating drum 118 and the endless belt 122 is first stripped of the light-sensitive material A by means of the finger 124 and the thus separated light-sensitive material A is guided by the roller 126 towards the disposal tray 28 and thence transported by a roller pair 132 to enter the disposal tray 28.

The heating drum 118 rotates further, whereupon the remaining image-receiving material C is separated from the drum 118 by means of the finger 128 and the thus separated image-receiving material C is guided by the roller 130 towards the recovery tray 26 and thence directed by guides 151 and 152 as it is transported by roller pairs 134, 135 and 136 to enter the recovery tray 26.

If desired, the image forming apparatus of the present invention may be implemented as a color printer. It should also be noted that the method of development is in no way limited to scan exposure with the light source being moved as in the cases shown in the accompanying drawings and that other applicable methods include scan exposure with the document platen being moved, as well as real exposure.

Needless to say, the image forming apparatus of the present invention is in no way limited to the cases described on the foregoing pages and that various modification and improvements can be made without departing from the spirit and scope of the invention.

As described on the foregoing pages in detail, the image forming apparatus of the present invention is basically of the type that forms the image of a document on a receiving material by thermal development and transfer while making selection from a plurality of light-sensitive and image-receiving materials and it is characterized by its ability to form high-quality image consistently irrespective of which combination of light-sensitive and image-receiving materials is selected. As a further advantage, this apparatus is capable of efficient image formation without waiting for the end of temperature adjustments even in the case of changing the species of the light-sensitive material or image-receiving material to be used.

What is claimed is:

1. An image forming apparatus having a plurality of species of light-sensitive material and a plurality of species of image-receiving material, comprising an exposure unit to first perform scan exposure on said light-sensitive material, an applicator to apply an image forming solvent to at least one of the exposed light-sensitive material and the image-receiving material onto which a developed image is to be transferred, and means for bringing said light-sensitive and image-receiving materials into a superimposed relationship for thermal development and transfer to form the developed and transferred image on the receiving material, wherein image formation is performed with a temperature condition being held substantially constant whereas other conditions for image forming are varied between preset values in accordance with various combinations of said light-sensitive and image-receiving materials, and wherein said temperature condition consists of a temperature of said image forming solvent and a temperature for the thermal development and transfer, and said other conditions for image forming comprise at least one condition of a coating weight of the image forming solvent, a time of the thermal development and transfer, and an amount of color and density adjustments at the time of the exposure.

2. An image forming apparatus comprising:

means for performing scan exposure on a light-sensitive material;

means for applying an image forming solvent to at least one of the exposed light-sensitive material and an image-receiving material onto which a developed image is to be transferred;

means for bringing said light-sensitive and image-receiving materials into a superposed relationship;

means for subjecting the light-sensitive and image-receiving materials to thermal development and transfer to form the developed and transferred image on the receiving material;

means for supplying the light-sensitive and image-receiving materials, the light-sensitive and image-receiving materials being each provided in a plurality of available species; and means for performing image formation with a temperature conditions being held substantially constant whereas other condition for image forming are varied between preset values in accordance with various combinations of said light-sensitive and image-receiving materials.

3. An image forming apparatus according to claim 2, wherein said temperature condition consists of a temperature of said image forming solvent and a temperature for the thermal development and transfer, and said other conditions for image forming comprise at least one condition of a coating weight of the image forming solvent, a time of the thermal development and transfer, and an amount of color and density adjustments at the time of the exposure.

4. An image forming apparatus having a plurality of species of light-sensitive material and a plurality of species of image-receiving material, comprising:

an exposure unit to first perform scan exposure on said light-sensitive material;

an applicator to apply an image forming solvent to at least one of the exposed light-sensitive material and the image-receiving material onto which a developed image is to be transferred;

means for superimposing said light-sensitive and image-receiving materials for thermal development and transfer to form the developed and transferred image on the receiving material; and controlling means for maintaining a temperature of said image forming solvent and a temperature of said thermal development at a preset constant value, while varying other conditions for thermal development and transfer according to preset values depending on the various combinations of said light-sensitive and image-receiving materials used.

5. The image forming apparatus of claim 4 wherein said other conditions for thermal development and transfer comprise at least one of a coating weight of said image forming solvent, a duration of said thermal development and transfer, and an amount of color and density adjustment during said exposure.

* * * * *